Patented Apr. 17, 1945

2,373,740

UNITED STATES PATENT OFFICE 2,373,740

CONVERSION OF HYDROCARBONS

Stanley Francis Birch and Donald Maurice Besly, Sunbury-on-Thames, England, assignors to Anglo-Iranian Oil Company Limited, London, England, a British joint-stock corporation No Drawing. Application March 3, 1942, Serial No. 433,124. In Great Britain March 5, 1941

8 Claims. (Cl. 260—683.5)

This invention relates to a catalytic process for the preparation of 2.4 dimethylpentane from 2.3 dimethylpentane, or 2.3 dimethylpentane from 2.4 dimethylpentane.

These hydrocarbons have the following properties:

|  | B. P., °C. | O. N. (C. F. R. M.) |
|---|---|---|
| (I) 2.3 dimethylpentane | 89.8 | 89 |
| (II) 2.4 dimethylpentane | 80.6 | 82 | and they have the following spacial formulae:

(I)   $CH_3\ CH_3$ $CH_3\cdot CH\cdot CH\cdot CH_2\cdot CH_3$ (II)   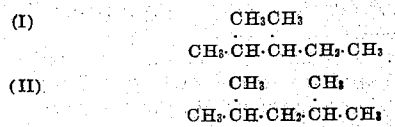

The boiling points of the hydrocarbons are approximately 10° C. apart, and it is thus possible to prepare either hydrocarbon in a substantially pure form from the other, or from a mixture containing the other with paraffins or naphthenes of nearly related boiling point, from which it cannot be effectively separated by physical means.

Apart from the obvious advantages to be derived in the way of increased octane rating by converting the 2.4 form into the 2.3, the reverse conversion is advantageous, for example when the 2.3 isomer is associated with low octane number paraffins of nearly related boiling point, such as methylhexanes, from which it cannot be separated by fractionation, a quantity of the lower boiling hydrocarbon may be produced according to the invention, separated from the associated hydrocarbons by distillation, and if desired reconverted into substantially pure 2.3 dimethylpentane by repeating the catalytic treatment.

According to the invention the reactions are carried out in the presence as catalyst of concentrated sulphuric acid (for example of 97% concentration) at temperatures within the range of —10° C. to +50° C. under conditions of vigorous stirring of the reaction mixture and preferably in the range —10° C. to +30° C., the acid hydrocarbon ratio being advantageously of the order of 1:1.

Alternatively, according to the invention the process may be carried out under the same conditions at temperatures of the order of —30° C. to —70° C. and preferably below —50° C. in the presence as catalyst of chlorsulphonic or fluorsulphonic acid; or at ordinary temperatures and otherwise under the same conditions in the presence of liquid anhydrous hydrogen fluoride as catalyst.

According to the invention the alternative reactions do not proceed to completion.

The following are examples of conditions in which the process of the invention may be carried out.

*Example I.*—2.3 dimethylpentane (1230 grams) was contacted with 97% sulphuric acid (4429 grams) at ordinary temperatures under conditions of vigorous stirring. At the end of a period of 42 hours the stirring was discontinued and the separated hydrocarbon layer washed with water and neutralised with diluted caustic soda solution. On fractionation, using a column equivalent to 25 theoretical plates, there was obtained a fraction weighing 640 grams boiling between 79° C. and 85° C. consisting essentially of 2.4 dimethylpentane. This represents a conversion of approximately 50%. The residue was found to consist substantially of unchanged 2.3 dimethylpentane.

*Example II.*—2.4 dimethylpentane (1345 grams) was stirred with sulphuric acid (3663 grams) of 97% strength under conditions similar to those employed in Example I. Stirring was discontinued at the end of 40 hours, and the hydrocarbon layer washed, neutralised and fractionated through a column equivalent to 25 theoretical plates. After removal of the unchanged 2.4 isomer of boiling range 80° C. to 85° C. and mainly 80.8° C., there was obtained a quantity of material (458 grams) boiling between 85° C. and 90.5° C. and consisting of substantially pure 2.3 dimethylpentane associated with small amounts of 2 and 3 methylhexane from which it cannot be completely separated by fractionation. The conversion was approximately 34%.

The relatively low octane number of the 2 and 3 methylhexanes (approximately 45 O. N.) obtained in this way may result in the octane number of the 2.3 dimethylpentane fraction being somewhat lower than might be anticipated. The amount of methylhexanes increases with the time of contact, which however should be as short as possible.

The time of contact in the above examples is in excess of that necessary to obtain a satisfactory conversion. In practice the time of contact may be substantially shortened with advantage. The acid is not spent and may be used repeatedly although coloured in use.

Substances such as methylcyclohexane which are unaffected by concentrated sulphuric acid may be present in the reaction mixture without disadvantage. Thus the process may be carried out under the conditions of the following example.

*Example III.*—A mixture of 2.3 dimethylpentane (557 grams) and methylcyclohexane (615 grams) was vigorously stirred at a temperature within the range −10° C. to +30° C. with sulphuric acid of 97% strength (4484 grams) for 48 hours. The acid was then separated and the upper hydrocarbon layer neutralised and fractionated. The portion distilling at approximately 80° C. consisted of 2.4 dimethylpentane and represented 53% conversion of the 2.3 dimethylpentane when the reaction was carried out at 20° C.

We claim:

1. The process comprising contacting, under conditions of vigorous agitation, a hydrocarbon material comprised of a dimethyl pentane whose methyl groups are attached to separate carbon atoms, with a catalyst selected from the group consisting of concentrated sulphuric acid, halosulphonic acid and hydrogen fluoride, at an isomerisation temperature to convert said dimethyl pentane into a dimethyl pentane whose methyl groups are attached to a different pair of carbon atoms, and recovering essentially said last-mentioned dimethyl pentane as a product.

2. The process comprising contacting, under conditions of vigorous agitation, a hydrocarbon material comprised of a dimethyl pentane whose methyl groups are attached to separate carbon atoms and of a hydrocarbon of nearly related boiling point, with a catalyst to which said hydrocarbon is substantially inert selected from the group consisting of concentrated sulphuric acid, halo-sulphonic acid and hydrogen fluoride, at an isomerisation temperature to convert said dimethyl pentane into a dimethyl pentane whose methyl groups are attached to a different pair of carbon atoms, and fractionating the product of reaction to recover essentially said last-mentioned dimethyl pentane as a desired product.

3. The process comprising contacting, under conditions of vigorous agitation, a hydrocarbon material comprised of 2.3 dimethylpentane and a hydrocarbon of nearly related boiling point, with a catalyst to which said hydrocarbon is substantially inert selected from the group consisting of concentrated sulphuric acid, halo-sulphonic acid and hydrogen fluoride, at an isomerisation temperature to convert said 2.3 dimethylpentane into 2.4 dimethylpentane, recovering essentially said 2.4 dimethylpentane as an intermediate product and catalytically reconverting said 2.4 dimethylpentane into 2.3 dimethylpentane by contacting it with said catalyst at an isomerisation temperature and under conditions of vigorous agitation.

4. The process of claim 1 in which 2.3 dimethylpentane is the dimethyl pentane of which said hydrocarbon material is comprised and 2.4 dimethylpentane is recovered as the desired product.

5. A process as specified in claim 1, in which concentrated sulphuric acid is the catalyst and the reaction is carried out at a temperature within the range −10° to +50° C.

6. A process as specified in claim 1, in which concentrated sulphuric acid is the catalyst and the reaction is carried out at a temperature within the range −10° to +50° C., and in which the acid-hydrocarbon ratio is 1:1.

7. A process as specified in claim 1, in which the catalyst is a halo-sulphonic acid, and the reaction is carried out at a temperature within the range −30° to −70° C.

8. A process as specified in claim 1, in which the catalyst is liquid anhydrous hydrogen fluoride, and the conversion is carried out at ordinary temperatures.

STANLEY FRANCIS BIRCH.
DONALD MAURICE BESLY.